United States Patent
Taka et al.

(10) Patent No.: US 9,856,979 B2
(45) Date of Patent: Jan. 2, 2018

(54) TRANSMISSION CONTROL DEVICE AND LEARNING METHOD FOR SYNCHRONIZER BALK POSITION

(71) Applicant: HONDA MOTOR CO., LTD., Tokyo (JP)

(72) Inventors: Shohei Taka, Wako (JP); Eiji Hanai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/417,531

(22) Filed: Jan. 27, 2017

(65) Prior Publication Data

US 2017/0219097 A1    Aug. 3, 2017

(30) Foreign Application Priority Data

Feb. 3, 2016   (JP) ................. 2016-018613

(51) Int. Cl.
| | |
|---|---|
| *B60W 10/02* | (2006.01) |
| *B60W 10/113* | (2012.01) |
| *F16H 61/688* | (2006.01) |
| *F16H 3/093* | (2006.01) |
| *F16H 3/00* | (2006.01) |
| *F16H 61/12* | (2010.01) |

(52) U.S. Cl.
CPC ........... *F16H 61/688* (2013.01); *F16H 3/006* (2013.01); *F16H 3/093* (2013.01); *F16H 61/12* (2013.01); *F16H 2342/04* (2013.01)

(58) Field of Classification Search
CPC .... B60W 10/02; B60W 10/113; B60W 30/19; B60W 2710/022; F16H 61/12; F16H 61/688; F16H 2342/04
See application file for complete search history.

(56) References Cited

U.S. PATENT DOCUMENTS

| | | | | |
|---|---|---|---|---|
| 2,590,232 A | * | 3/1952 | Chilton | ........... F16H 3/006 192/3.57 |
| 8,831,845 B1 | * | 9/2014 | Tao | ........... B60W 10/113 701/58 |
| 2012/0312110 A1 | * | 12/2012 | Kim | ........... B60W 10/02 74/325 |

FOREIGN PATENT DOCUMENTS

| | | |
|---|---|---|
| JP | 2005-042798 | 2/2005 |
| WO | 2010/046307 | 4/2010 |

* cited by examiner

*Primary Examiner* — Edwin A Young
(74) *Attorney, Agent, or Firm* — Rankin, Hill & Clark LLP

(57) ABSTRACT

A transmission includes first and second input shafts connected via a first clutch to a power source, an output shaft, a first shift gear group including shift gears arranged between the first input and output shafts, a first switching mechanism including a synchronizer for selecting one shift gear from the group, a second shift gear group including shift gears arranged between the second input shaft and the output shaft, and a second switching mechanism including a synchronizer for selecting one shift gear from the group. In order to learn a synchronizer balk position, either the first or second shift gear group, where no targeted synchronizer belongs, is set to any shift gear, both the first and second clutches are engaged, the balk position of the synchronizer is detected in a process of the targeted synchronizer being slid, and information specifying the detected position is stored.

4 Claims, 4 Drawing Sheets

TRANSMISSION CONTROL DEVICE AND LEARNING METHOD FOR SYNCHRONIZER BALK POSITION

CROSS-REFERENCE TO RELATED APPLICATION

The present disclosure relates to a subject included in Japanese Patent Application 2016-018613 filed dated on Feb. 3, 2016, and, as a whole, the disclosure therein should be incorporated in this application explicitly by reference.

BACKGROUND OF THE INVENTION

Field of the Invention

The present invention relates to a control device for a transmission of a vehicle, and in particular, a control device for learning a synchronizer balk position in a dual clutch type transmission including two shift shafts for odd- and even-numbered shift gears and a shift gear mechanism related thereto. The present invention further relates to a learning method for the synchronizer balk position.

Description of the Related Art

Japanese Patent Application Publication No. 2005-42798 (Patent Document 1) discloses an art for learning and storing a balk position (balk point) of a synchronizer (namely, synchromesh mechanism) beforehand for switching shift gears in a transmission gear train provided between an input shaft and an output shaft mutually parallel to each other to be used for stroke control of a sleeve. The balk position (balk point) is a position at which a synchronous sleeve contacts with a synchronizer ring in the process of sliding (shifting) of the sleeve. At this contact position, the sleeve stops to move for an instant, thereby allowing to confirm (learn) this balk position. If a balk position (balk point) is learned beforehand for every individual synchronizer, effective synchronous control can be performed by, for example, switching driving force of an actuator for sliding the synchronous sleeve when the synchronous sleeve reaches the balk position in operation of the actuator. As every individual synchronizer has its own balk position due to its individual differences, such balk position learning is indispensable before factory shipment of the transmission or at the time of maintenance. It should be noted that at the time of balk position learning, a difference between input and output rotations of the synchronizer needs to be kept constant.

On the other hand, a dual clutch type transmission including two shift shafts for odd- and even-numbered shift gears and a shift gear mechanism related thereto is also known (for example, refer to International Publication WO2010/046307 (Patent Document 2)). In such dual clutch type transmission, a first shift gear mechanism is installed between a first input shaft, detachably connected via a first clutch to a power source (for example, internal-combustion engine), and an output shaft (counter shaft). Also, a second shift gear mechanism is installed between a second input shaft, detachably connected via a second clutch to the power source, and the output shaft (counter shaft). Shift gears in the first and second shift gear mechanisms are switched/selected using synchronizers installed so as to correspond to the shift gears.

Conventionally, in such dual clutch type transmission, the synchronizer balk position learning is conducted by setting the rotation speed of the output shaft (counter shaft) at 0 with the brake on, and with the first or second clutch on. For example, in the case of synchronizer balk position learning for an odd-numbered shift gear, the difference between the input and output rotations of the synchronizer is kept constant by turning on the brake and the first clutch (or the input and output rotations of the synchronizer are kept respectively at the engine speed and 0), and then the sleeve is slid. In the case of synchronizer balk position learning for an even-numbered shift gear, the difference between the input and output rotations of the synchronizer is kept constant by turning on the brake and the second clutch (or the input and output rotations of the synchronizer are kept respectively at the engine speed and 0), and then the sleeve is slid.

SUMMARY OF THE INVENTION

However, in a dual clutch type transmission for establishing the first gear using a gear coupled to a one-way clutch installed to the counter shaft, which has been developed in the recent years, the above-described conventional way of synchronizer balk position learning is infeasible. In such latest dual clutch type transmission, no synchronizer is installed to the first gear provided between the first input shaft and the counter shaft. Accordingly, rotation transmission from the first input shaft to the counter shaft is conducted via the one way clutch installed to the counter shaft at the gear ratio of the first gear. The transmission structure as described above causes the following consequence in attempting to learn as per usual a balk position of a synchronizer at another odd-numbered shift gear installed in the first shift gear mechanism. Namely, when an engine output is connected to the first input shaft with the output shaft (counter shaft) stopped by braking and with the first clutch on, the stopped output shaft (counter shaft) is connected, via the one-way clutch and the first gear, to the engine output, thereby causing an engine stall and thus disabling continuous learning.

The present invention is achieved in view of the above-described problems, and the purpose is to by way of synchronizer balk position learning using a technique different from a conventional one, provide a transmission control device enabling synchronizer balk position learning without any inconvenience, and to provide a learning method for the synchronizer balk position.

A control device for a transmission in accordance with the present invention includes a learning control means for learning a balk position of a synchronizer in the transmission. The transmission includes a first input shaft connected via a first clutch to a power source, a second input shaft connected via a second clutch to the power source, an output shaft, a first shift gear group, composed of a plurality of shift gears arranged between the first input shaft and the output shaft, for transmitting a rotation of the first input shaft via a selected one of the shift gears to the output shaft, a first switching mechanism, for selecting one of the shift gears from the first shift gear group, including a synchronizer for switching the selected shift gear from a state in which power is transmittable to a state in which power is intransmittable, a second shift gear group, composed of a plurality of shift gears arranged between the second input shaft and the output shaft, for transmitting a rotation of the second input shaft via a selected one of the shift gears to the output shaft, a second switching mechanism, for selecting one of the shift gears from the second shift gear group, including a synchronizer for switching the selected shift gear from the state in which power is transmittable to the state in which power is intransmittable. The learning control means, in order to learn a balk position of one of the synchronizers, sets either the first or second shift gear group, to which the one synchronizer targeted for learning never belongs, to an arbitrary one of the shift gears, engages both the first and second clutches, detects a balk position of the synchronizer in the process in which the synchronizer targeted for learning is slid, and then stores information that specifies the detected balk position.

Moreover, the learning method for the synchronizer balk position in the transmission in accordance with the present invention includes the four steps to be followed in the transmission in order to learn a balk position of one of the synchronizers. Namely, setting either the first or second shift gear group, to which the one synchronizer targeted for learning never belongs, to an arbitrary one of the shift gears, engaging both the first and second clutches, detecting a balk position of the synchronizer in the process in which the synchronizer targeted for learning is slid and storing information that specifies the detected balk position.

According to the present invention, since the learning control means, when learning a balk position of a synchronizer, sets either the first or second shift gear groups, to which the one synchronizer targeted for learning never belongs, to an arbitrary one of the shift gears and engages both the first and second clutches, a rotation of the power source from either the first or second clutch is transmitted to the input side of the synchronizer targeted for learning, and a rotation whose speed has been changed at the arbitrary one of the shift gears from the speed of the rotation of the power source transmitted from the other of the first and second clutches is transmitted to the output side of the synchronizer. This can keep the difference between the input and output rotations of the synchronizer targeted for learning constant, thereby satisfying the learning condition for the balk position. In this manner, the learning control means detects the synchronizer balk position and stores information specifying the detected balk position in the process in which the synchronizer targeted for learning is slid, thereby enabling an appropriate balk position learning. In addition, as no brake is on at the time of balk position learning unlike in the conventional way, neither the output shaft is stopped nor the power source is stalled.

In a preferred embodiment, the first shift gear group includes the lowest shift gear that is configured, without being selected by the first switching mechanism, to transmit a rotation of the first input shaft to the output shaft via the one-way clutch. The learning control means should be configured to learn a balk position of a synchronizer that belongs to at least the first shift gear group. In such way as using the one-way clutch at the lowest shift gear, as discussed above, the conventional manner of turning on the brake at the time of balk position learning causes the input and output shafts to be stopped and accordingly the power source to be stalled, thereby making the balk position learning infeasible. According to the present invention, however, neither the output shaft is stopped nor the power source is stalled also in the embodiment using the one-way clutch at the lowest shift gear. Thereby, this enables an appropriate balk position learning.

DESCRIPTION OF THE EMBODIMENTS

Figure 1:
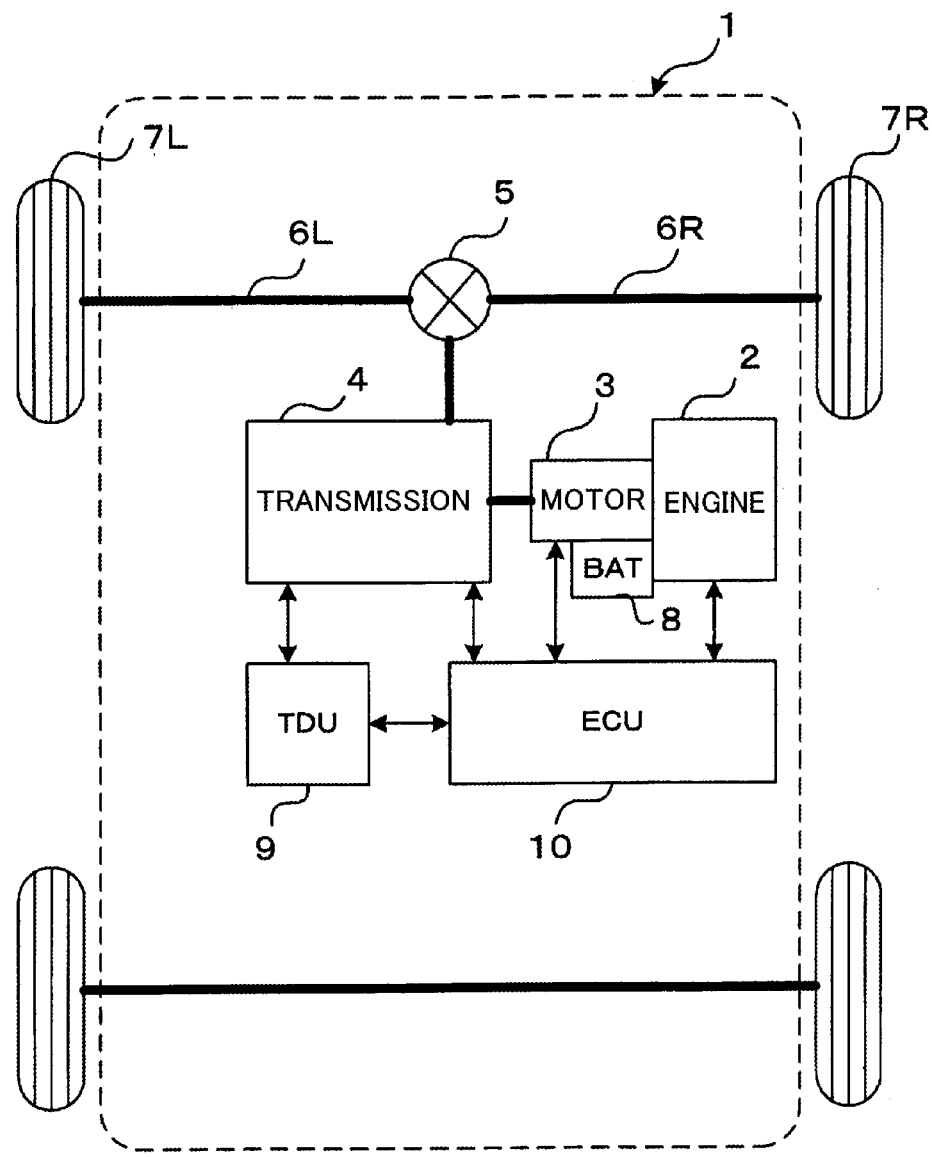
FIG. 1 is a schematic configuration diagram of a hybrid vehicle in one embodiment of the present invention.

FIG. 1 is a schematic configuration diagram of a hybrid vehicle in one embodiment of the present invention. A vehicle 1 of the present embodiment is a hybrid vehicle including a internal-combustion engine 2 and an electric motor generator 3 as power sources. A rotary driving force of the engine 2 and the electric motor generator 3 is transmitted to right and left driving wheels 7R, 7L via a transmission 4, a differential mechanism 5 and drive shafts 6R, 6L. The driving wheels 7R, 7L are front wheels of the vehicle in the figure, but may be rear wheels. A battery (BAT) 8 is connected to the motor generator 3, enabling power running and regenerative operation. A transmission drive unit (TDU) 9, for shift gear switching control in the transmission 4, includes a function to control a movement of a clutch and a synchronizer in the transmission 4. The transmission drive unit (TDU) 9 is controlled by an electronic control unit (ECU) 10 serving as a host controller.

Figure 2:
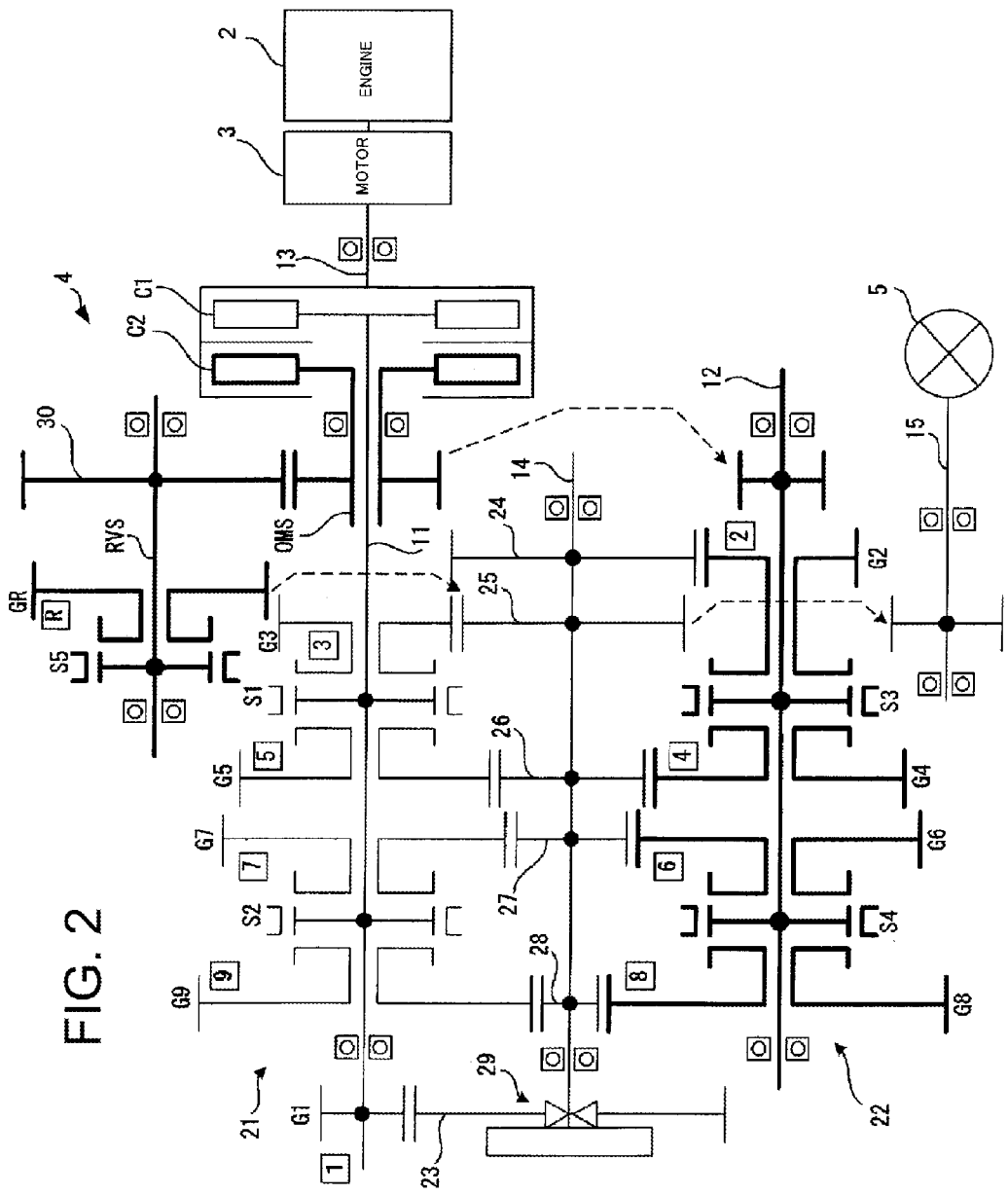
FIG. 2 is a skeleton view of a configuration example of the transmission shown in FIG. 1.

FIG. 2 is a skeleton view of a configuration example of the transmission shown in FIG. 1. This transmission 4 is a parallel shaft type transmission of nine forward gears and one reverse gear, including a main shaft 11 (first input shaft) connected to an output shaft 13 of the power source (engine 2 and motor generator 3) via a dual clutch composed of a first clutch C1 for odd-numbered shift gears and a second clutch C2 for even-numbered shift gears (including a reverse gear), an outer main shaft OMS, a secondary shaft 12 (second input shaft) and a reverse shaft RVS. Specifically, the first input shaft (main shaft 11) is connected detachably to the power source via the first clutch C1, and the second input shaft (the outer main shaft OMS and the secondary shaft 12) is connected detachably to the power source via the second clutch C2. More specifically, the output shaft of the first clutch C1 is coupled to the main shaft 11, the outside main shaft OMS is connected to the output shaft of the second clutch C2. This outer main shaft OMS is arranged concentrically so as to form an external cylinder of the main shaft 11. The outer main shaft OMS is always engaged with the reverse shaft RVS that functions also as idle shaft, and always engaged, via the idle shaft (reverse shaft RVS), with the secondary shaft 12. A rotary output of the second clutch C2 is transmitted, via the outer main shaft OMS, as a negative rotation with respect to the reverse shaft RVS (idle shaft), and as a positive rotation with respect to the secondary shaft 12. The main shaft 11, the secondary shaft 12 and the reverse shaft RVS are parallel to each other. Further, a counter shaft 14 functioning as an output shaft and a foot shaft 15 are provided parallel to each other. It should be noted that in FIG. 2, for the purpose of easy distinction, a power transmission route involving the odd-numbered shift gears is drawn with normal linewidth. And, a power transmission route involving the even-numbered shift gears (and the reverse gear) is drawn in a thick line.

Between the main shaft 11 (first input shaft) and the counter shaft 14 (output shaft), a first shift gear group 21 for establishing a plurality of odd-numbered shift gears is arranged. On the main shaft 11, a third driving gear G3, a fifth driving gear G5, a seventh driving gear G7 and ninth driving gear G9 are concentrically arranged so as to relatively rotate with respect to each other. Between the third driving gear G3 and the fifth driving gear G5, a synchronizer S1 for the third to fifth gears is provided slidably in the axial direction. Between the seventh driving gear G7 and the ninth driving gear G9, a synchronizer S2 for the seventh to ninth gears is provided slidably in the axial direction. The synchronizer corresponding to a desired one of the third, fifth, seventh and ninth gears is slid to synchronize and engage the desired shift gear, whereby the desired shift gear is coupled to the main shaft 11. The third, fifth, seventh and ninth driving gears G3, G5, G7, G9 are meshed with corresponding driven gears 25-28 fixed on the counter shaft 14. Accordingly, a rotation of the main shaft 11 is transmitted to the counter shaft 14 via the synchronized and engaged one of the third, fifth, seventh and ninth gears. In other words, selection/switching of the third, fifth, seventh and ninth gears are performed by sliding the synchronizers S1, S2.

On the other hand, a first (lowest) driving gear G1 is fixed to the main shaft 11. And, a driven gear 23 meshed with the first driving gear G1 is connected to the counter shaft 14 via the one-way clutch 29. The one-way clutch 29 is configured to transmit a positive rotation of the main shaft 11 transmitted via the first driving gear G1 to the counter shaft 14, but no negative rotation thereof. Being fixed to the main shaft 11, the first driving gear G1 rotates constantly while a rotation of the power source is transmitted to the main shaft 11 due to the connection of the first clutch C1. Accordingly, the driven gear 23 also rotate. However, as the counter shaft 14 rotates faster than the driven gear 23 when a shift gear other than the first gear is selected, a differential rotation between the driven gear 23 and the counter shaft 14 acts in such a direction as to disengage the one-way clutch 29, whereby the driven gear 23 enters the idle state. Therefore, no constant rotation of the first driving gear G1 and the corresponding driven gear 23 affects any power transmission using another (or higher) selected shift gear. On the other hand, the transmission using the first (or lowest) shift gear is established only by connecting the first clutch C1 with no other (higher) gears engaged.

The first shift gear group 21 for establishing the odd-numbered (first, third, fifth, seventh and ninth) shift gears is composed of the driving gears, the driven gears, the synchronizers S1, S2, the one-way clutch 29 provided in connection with the main shaft 11 connected to the first clutch C1. Moreover, the synchronizers S1, S2 for the odd-numbered shift gears function as the first switching mechanism for selecting (or engaging) one of the shift gears from the first shift gear group 21.

Between the secondary shaft 12 (second input shaft) and the counter shaft 14 (output shaft), a second shift gear group 22 composed of a plurality of even-numbered shift gears is arranged. On the secondary shaft 12, a second driving gear G2, a fourth driving gear G4, a sixth driving gear G6 and a eighth driving gear G8 are concentrically arranged relatively rotatably with respect to each other. Between the second driving gear G2 and the fourth driving gear G4, a synchronizer S3 for second to fourth gears is provided slidably in the axial direction. Between the sixth driving gear G6 and the eighth driving gear G8, a synchronizer S4 for sixth to eighth gears is provided slidably in the axial direction. The synchronizer corresponding to a desired one of the second, fourth, sixth and eighth gears is slid to synchronize and engage the desired shift gear, whereby the shift gear is coupled to the main shaft 12. The second, fourth, sixth and eighth speed driving gears G2, G4, G6, G8 are meshed with corresponding driven gears 24, 26-28 fixed on the counter shaft 14. Accordingly, a rotation of the secondary shaft 12 is transmitted to the counter shaft 14 via the synchronized and engaged gear of the second, fourth, sixth and eighth gears.

In other words, selection/switching of the second, fourth, sixth and eighth gears is performed by sliding the synchronizers S3, S4.

A gear 30 is fixed to the reverse shaft RVS, to which an output of the second clutch C2 is transmitted. In addition, on an outer periphery of the reverse shaft RVS, a reverse driving gear GR is provided concentrically so as to rotate relative to the reverse shaft RVS, and a synchronizer S5 for connecting the reverse driving gear GR selectively to the reverse shaft RVS. The reverse driving gear GR meshes with a driven gear 25 contrapositive to the third driving gear G3. Via this driven gear 25, a rotation of the reverse driving gear GR is transmitted, as a reverse rotation, to the counter shaft (output shaft) 14. Therefore, at the time of reverse running, by synchronizing and engaging the reverse gear using the synchronizer S5 and the second clutch C2, a rotation of the second clutch C2 is transmitted to the reverse shaft RVS via the outer main shaft OMS, thereby rotating the reverse driving gear GR via the synchronizer S5. When the reverse driving gear GR rotates, the driven gear 25 of the third driving gear G3 rotates in the direction opposite to the direction at the time of forward running, and the counter shaft 14 (output shaft) rotates via the driven gear 25 in the direction opposite to the direction at the time of forward running. It should be noted that in the case of reverse running, the synchronizer S1 shall be prohibited to engage the third gear by all means so as to idle the third driving gear G3.

Of the driving gears, the driven gears and the synchronizers S3, S4, S5 provided in connection with the secondary shaft 12 and the reverse shaft RVS connected to the second clutch C2, the second shift gear group 22 for establishing the even-numbered (second, fourth, sixth and eighth) shift gears and the reverse gear is composed. In addition, the synchronizers S3, S4, S5 for the even-numbered shift gears and the reverse gear function as the second switching mechanism for selecting (or engaging) one of the shift gears from the second shift gear group 22.

A rotation of the counter shaft 14 (output shaft) is transmitted to the foot shaft 15 (output shaft), then transmitted from the foot shaft 15 (output shaft) to the differential mechanism 5, thereby driving the driving wheels 7R, 7L of the vehicle 1.

Balk position learning of each the above-described synchronizers S1-S5 is performed before shipping the vehicle 1 from a factory and also in need of maintenance even after shipment. The balk position learning after shipment is performed in such a manner as the transmission drive unit (TDU) 9 controls a movement of the transmission 4 according to a computer program for balk position learning incorporated in the electronic control unit (ECU) 10. In this case, by a combination of the ECU 10 and the TDU 9, a configuration for executing the computer program for balk position learning functions as a learning control means. Moreover, as will be described later, the counter shaft 14 and the output shaft 15 rotate at the time of balk position learning according to the present invention, which requires the learning control means to perform control in the state in which the vehicle 1 is lifted up for preventing any movement thereof.

On the other hand, the balk position learning before shipping the vehicle 1 from the factory is performed before mounting the transmission 4 on the vehicle 1. In this case, as a power source for inputting to the first and second clutches C1, C2 of the transmission 4, an appropriate motor as a jig is used. Also, a host control device (as a jig) equal to the ECU 10 installing the executable computer program for balk position learning is used, and a subordinate control device (as a jig) equal to the TDU 9 is used. In that case, the computer program for balk position learning is executed using a combination of the host and subordinate control devices as jigs. It should be noted that in the balk position learning targeted for the transmission 4 before mounted on the vehicle 1, no such preventive measure as lifting up is required as the counter shaft 14 and the foot shaft 15 (namely, output shaft) may rotate idly.

Figure 3:
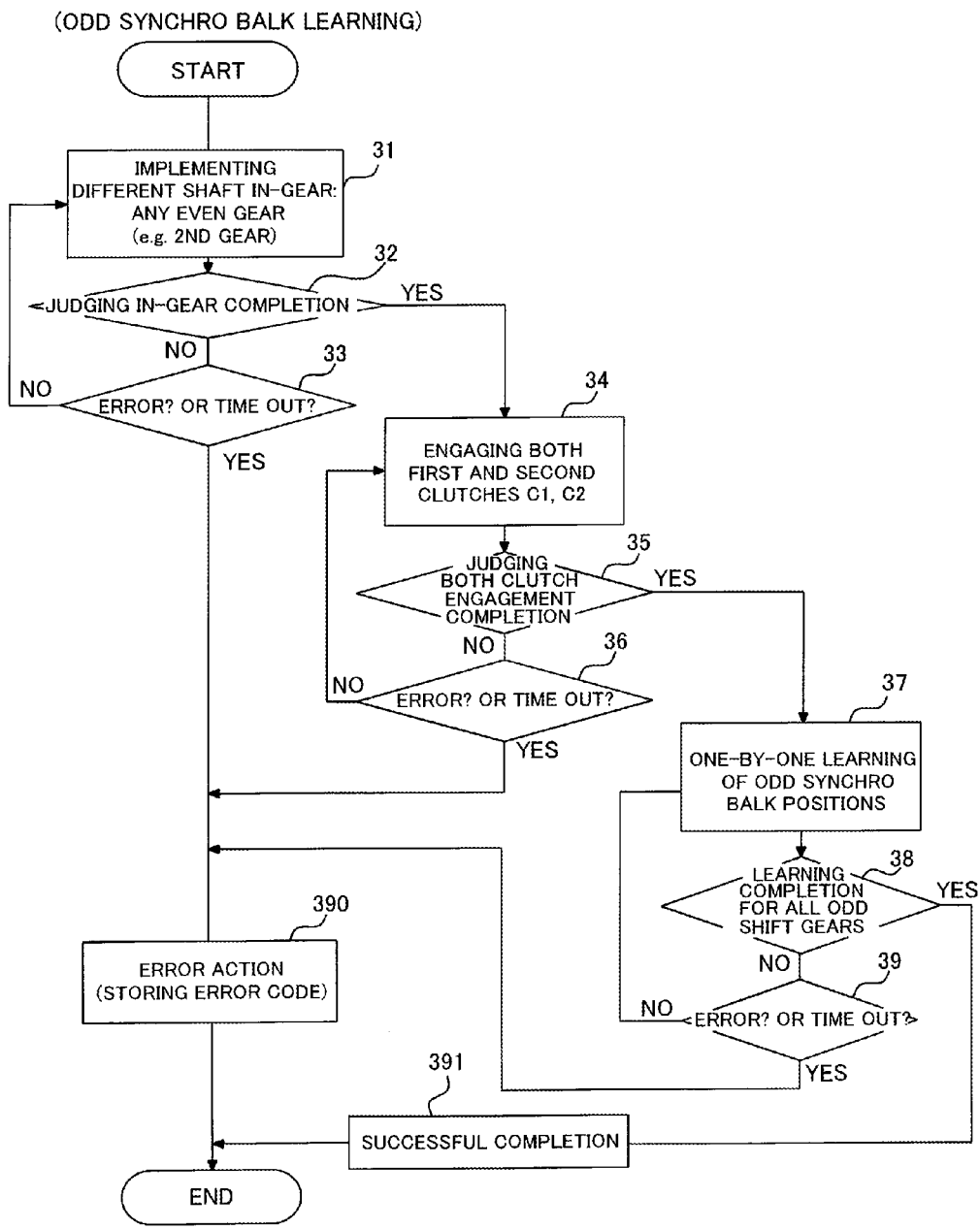
FIG. 3 is a flow chart illustrating an example of a processing performed when there is a request for synchronizer balk position learning for an odd-numbered shift gear.

Next, a specific method as to balk position learning of each of the synchronizers S1-S5 using the above-described learning control means will be described with reference to FIGS. 3 and 4. FIG. 3 is a flow chart illustrating an example of a processing performed when there is a request for synchronizer balk position learning for an odd-numbered shift gear. The balk position learning according to the present invention should be subject to the precondition that the power source (engine 2 or motor 3) rotate at a constant rotation speed and the brake be off.

Figure 4:
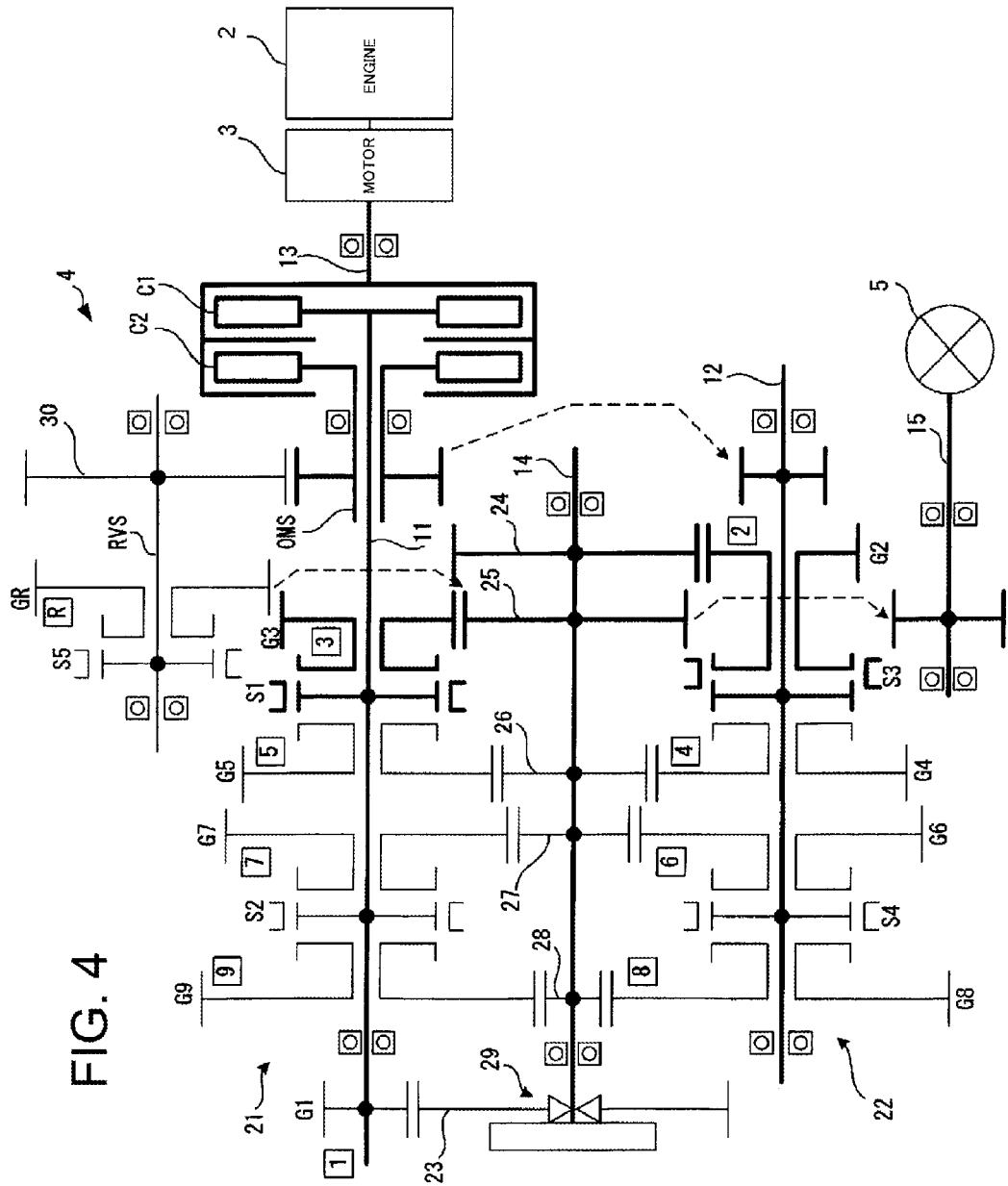
FIG. 4 is a skeleton view of a transmission, similar to FIG. 2, schematically illustrating a power transmission route in a thick line that becomes effective at the time of synchronizer balk position learning for a third gear according to this embodiment.

FIG. 4 is a skeleton view of the transmission, similar to FIG. 2, schematically illustrating a power transmission route in a thick line that becomes effective at the time of synchronizer balk position learning for the third gear according to this embodiment.

In Step 31, a different shaft in-gear (in-gear of an arbitrary one of the even-numbered shift gears) is performed. Namely, the second shift gear group 22 (or the even-numbered shift gear group to which no odd-numbered shift gear targeted for learning belongs) on the secondary shaft 12 (second input shaft) is set to a predetermined arbitrary shift gear (for example, the second gear) to be engaged. In FIG. 4, for example, the synchronizer S3 is slid to the second driving gear G2 side to engage the second gear, thereby setting power transmission from the secondary shaft 12 (second input shaft) to the counter shaft 14 (output shaft) to the second gear.

Step 32 judges whether the in-gear of the second gear performed in Step 31 is complete. At this time, just in case, the synchronizers S1, S2 on the first shift gear group 21 (odd-numbered shift gear group) side should be confirmed to be in neutral. If no in-gear completion is judged in Step 32, the processing proceeds to Step 33 for error check to judge whether a predetermined error condition is satisfied or whether a predetermined time-out condition is satisfied. If neither the error condition nor the time-out condition is satisfied, the processing returns to Step 31 from NO to Step 33. If the in-gear completion is judged in Step 32, the processing proceeds to Step 34. If no in-gear completion is judged, and if the predetermined error condition or the time-out condition (lapse of a given time) is satisfied, the processing jumps from YES to Step 33 to Step 390.

In Step 34, both the first and second clutches C1, C2 are engaged at a predetermined torque. Step 35 judges whether the engagement of the first and second clutches C1, C2 is complete. If the engaging torque of both the clutches C1, C2 reaches a specified value, the engagement is judged to be complete, and then the processing proceeds to Step 37. If no clutch engagement is confirmed to be complete, the processing proceeds to Step 36 for error check to judge whether a predetermined error condition or a predetermined time-out condition is satisfied. If neither the error condition nor the time-out condition is satisfied, the processing returns to Step 34 from NO to Step 36. If the predetermined error condition or the time-out condition (lapse of a given time) is satisfied, the processing jumps from YES to Step 36 to Step 390.

With reference to FIG. 4, in a state in which both the first and second clutches C1, C2 are in engagement, a rotation with a given speed (let it be N10) from the power source (engine 2 or motor 3) is transmitted to the main shaft 11 (first input shaft) via the first clutch C1 in engagement. Simultaneously, from the second clutch C2 in engagement, a rotation from the power source is transmitted to the outer main shaft OMS, the idle shaft and the secondary shaft 12 (second input shaft). Thus, a rotation (let it be N20) whose speed has been changed via the driven gear 24 is transmitted to the counter shaft 14 (output shaft) from the second driving gear G2 in gear. Due to the brake-off state, the output shaft 15 rotates idly accompanying the counter shaft 14 (output shaft). It should be noted that the counter shaft 14 rotates in the second gear faster than the first driving gear G1 rotating accompanying a rotation of the main shaft 11 (first input shaft), which causes the one-way clutch 29 to idle.

Referring back to FIG. 3, in Step 37, balk position learning of the synchronizers S1, S2 for the odd-numbered (third, fifth, seventh and ninth) shift gears is performed per gear. For example, in the case of the synchronizer for the third gear to be targeted for learning, (a sleeve of) the synchronizer S1 is gradually slid toward the third driving gear G3, and a position where the sliding movement stops in the process of such gradual sliding is detected as a balk position. Then, data of the detected balk position is stored in association with the third gear as a current target for learning. An example of how to detect the balk position is as follows. In monitoring changes in detected value of a stroke sensor (not shown in the figure) provided on an actuator (not shown in the figure) of the sleeve, if a detected value of the stroke sensor shows no change for more than a given period of time while the actuator is being driven, the stroke detection value at that time is stored as balk position data. The detected balk position data is stored in a non-volatile manner, for example, in a memory as a storage provided in connection with the ECU 10. In this manner, the balk position learning for one of the synchronizers (synchronizer for the third gear) is performed.

Referring to FIG. 4, on one hand, when the synchronizer S1 is slid in Step 37 to the third gear side for the purpose of the balk position learning of the synchronizer for the third gear, a rotation with the given speed N10 from the power source (engine 2 or motor 3) is transmitted from the first clutch C1 in engagement, via the main shaft 11 (first input shaft), to the input side of the synchronizer S1. On the other hand, a rotation with a given speed (let it be N3) in proportion to the second gear rotation speed N20 is transmitted to the third gear output side of the synchronizer S1 from the second clutch C2 in engagement, via the outer main shaft OMS, the idle shaft, the secondary shaft 12 (second input shaft), the second driving gear G2 in gear, the second driven gear 24, the counter shaft 14 (output shaft), the third driven gear 25 and the third driving gear G3. Therefore, a difference between the input and output rotations (N10-N3) of the synchronizer for the third gear targeted for learning can be kept constant, thereby satisfying the condition of balk position learning. This enables an appropriate balk position learning. In addition, as no brake is on at the time of balk position learning unlike in the conventional way, neither the output shaft is stopped, nor the power source is stalled.

Referring back to FIG. 3, once the balk position learning of one of the synchronizers in Step 37 is complete, the processing proceeds to Step 38 to judge whether the balk position learning of the synchronizers for all of the odd-numbered shift gears is complete. If the synchronizer balk position learning for any one or ones the odd-numbered shift gears is incomplete, the processing returns to Step 37 via Step 39 for error check. Step 39 judges whether a predetermined error condition is satisfied or whether a predetermined time-out condition is satisfied. When neither the error condition nor the time-out condition is satisfied, the processing returns to Step 37 from NO to Step 39. If the predetermined error condition or the predetermined time-out condition (lapse of a given time) is satisfied, the processing jumps from YES to Step 36 to Step 390.

Back in Step 37, balk position learning for one of the unlearned odd-numbered shift gears is performed in the same way as described above. For example, in the case of the synchronizer for the fifth gear to be targeted for learning, (a sleeve of) the synchronizer S1 is gradually slid toward the third driving gear G5, and a position where the sliding movement stops in the process of such gradual sliding is detected as a balk position. Then, data of the detected balk position is stored in association with the fifth gear as a current target for learning. In this case also, on one hand, a rotation with the given speed N10 from the power source (engine 2 or motor 3) is transmitted via the main shaft 11 (first input shaft) from the first clutch C1 in engagement to the input side of the synchronizer S1. On the other hand, a rotation with a given speed (let it be N5) in proportion to the second gear rotation speed N20 is transmitted to the fifth gear output side of the synchronizer S1 from the second clutch C2 in engagement, via the outer main shaft OMS, the idle shaft, the secondary shaft 12 (second input shaft), the second driving gear G2 in gear, the second driven gear 24, the counter shaft 14 (output shaft), the fifth driven gear 26 and the fifth driving gear G5. Therefore, a difference between the input and output rotations (N10-N5) of the synchronizer for the fifth gear targeted for learning can be kept constant, thereby satisfying the condition of balk position learning. This enables an appropriate balk position learning.

Subsequently, by repeating Step 37, balk position learning for the remaining synchronizers for the seventh and ninth gears is performed in the same manner. Namely, in the case of balk position learning of the synchronizer for the seventh gear, the synchronizer S2 is slid toward the seventh driving gear G7. In the case of balk position learning of the synchronizer for the ninth gear, the synchronizer S2 is slid toward the ninth driving gear G9. A rotation speed on the input side of the synchronizer S2 for the seventh gear is N10, the same as above described. A rotation with a given speed (let it be N7) in proportion to the second gear rotation speed N20 is transmitted to the output side of the synchronizer for the seventh gear via the counter shaft 14 (output shaft), the seventh driven gear 27 and the seventh driving gear G7 (see FIG. 2 or 4). Therefore, a difference between the input and output rotations (N10-N7) of the synchronizer for the seventh gear targeted for learning can be kept constant, thereby satisfying the condition of balk position learning. A rotation speed on the input side of the synchronizer S2 for the ninth gear is N1, the same as above described. A rotation with a given speed (let it be N9) in proportion to the second gear rotation speed N20 is transmitted to the output side of the synchronizer for the ninth gear via the counter shaft 14 (output shaft), the ninth driven gear 29 and the ninth driving gear G9 (see FIG. 2 or 4). Therefore, a difference between the input and output rotations (N10-N9) of the synchronizer for the ninth gear targeted for learning can be kept constant, thereby satisfying the condition of balk position learning.

Back in FIG. 3, after the balk position learning of the synchronizers for all of the odd-numbered shift gears in Step 38 is judged to be complete, the processing proceeds to Step 391 to confirm that the balk position learning of the synchronizers S1, S2 for all of the odd-numbered shift gears is complete successfully. On the contrary, in case any error is found, the processing proceeds to Step 390 to take a predetermined error action (for example, storing an error code indicating a category of errors).

The balk position learning of the synchronizers for the even-numbered shift gears may be performed in the similar manner to the balk position learning of the synchronizers for the odd-numbered shift gears, as shown in FIG. 3. In this regard, however, in the case of balk position learning of the synchronizers for the even-numbered shift gears, in the processing of "different shaft in-gear" in Step 31 in FIG. 3, the processing should be changed so as to synchronize and engage an arbitrary one of the odd-numbered shift gears (for example, the fifth gear). (In other word, the arbitrary one of the odd-numbered shift gears of the first shift gear group 21 to which no even-numbered shift gear targeted for learning belongs is engaged.) Further, needless to say, in the case of synchronizer balk position learning for an even-numbered shift gear, in Step 37 in FIG. 3, the processing should be changed so as to perform balk position learning of the synchronizers S3, S4, S5 for the even-numbered (second, fourth, sixth and eighth) shift gears and the reverse gear per gear.

That is to say, in the case of synchronizer balk position learning for the even-numbered shift gears, an arbitrary one of the even-numbered shift gears (for example, the fifth gear) is engaged, and both the first and second clutches C1, C2 are engaged. Then, similar to Step 37 in FIG. 3, balk position learning of the synchronizers S3, S4, S5 for the even-numbered (second, fourth, sixth and eighth) shift gears and the reverse gear is performed per gear.

For example, in the case of the synchronizer for the second gear, (a sleeve of) the synchronizer S3 is gradually slid toward the second driving gear G2, and a position where the sliding movement stops in the process of such gradual sliding is detected as a balk position. Then, data of the detected balk position is stored in association with the second gear as a current target for learning. Referring to FIG. 2, on one hand, when the synchronizer S3 is slid to the second gear side for the purpose of synchronizer balk position learning for the second gear, a rotation with a given speed (let it be N1) from the power source (engine 2 or motor 3) is transmitted from the second clutch C2 in engagement, via the outer main shaft OMS, the idle shaft, the secondary shaft 12 (second input shaft), to the input side of the synchronizer S3. On the other hand, a rotation with a given speed (let it be N5) in proportion to the second gear rotation speed (let it be N50) is transmitted to the second gear output side of the synchronizer S1 from the second clutch C2 in engagement, via the main shaft (first input shaft), the fifth driving gear G5 in gear, the fifth driven gear 27, the counter shaft 14 (output shaft), the second driven gear 24 and the second driving gear G2. Therefore, a difference between the input and output rotations (N11-N2) of the synchronizer for the second gear targeted for learning can be kept constant, thereby satisfying the condition of balk position learning. This enables an appropriate balk position learning.

Subsequently, the balk position learning for the remaining synchronizers for the fourth, sixth, eighth gears and the reverse gear is performed in the same manner. Namely, in the case of synchronizer balk position learning for the fourth gear, the synchronizer S3 is slid toward the fourth driving gear G4. In the case of synchronizer balk position learning for the sixth gear, the synchronizer S4 is slid toward the sixth driving gear G6. In the case of synchronizer balk position learning for the eighth gear, the synchronizer S4 is slid toward the eighth driving gear G8. And, in the case of balk position learning of the reverse gear synchronizer, the synchronizer S5 is slid toward the reverse driving gear GR.

Referring to FIG. 2, a rotation speed on the input side of the synchronizer S3 for the fourth gear is N11, the same as above described. A rotation with a given speed (let it be N4) in proportion to the fifth gear rotation speed N50 is transmitted to the output side of the synchronizer for the fourth gear via the counter shaft 14 (output shaft), the fourth driven gear 26 and the fourth driving gear G4. Therefore, a difference between the input and output rotations (N11-N4) of the synchronizer for the fourth gear targeted for learning can be kept constant, thereby satisfying the condition of balk position learning.

Moreover, a rotation speed on the input side of the synchronizer S4 for the sixth gear is N11, the same as above described. A rotation with a given speed (let it be N6) in proportion to the fifth gear rotation speed N50 is transmitted to the output side of the synchronizer for the sixth gear via the counter shaft 14 (output shaft), the sixth driven gear 27 and the sixth driving gear G6. Therefore, the difference between the input and output rotations (N11-N6) of the synchronizer for the sixth gear targeted for learning can be kept constant, thereby satisfying the condition of balk position learning.

Moreover, a rotation speed on the input side of the eighth gear synchronizer S4 is N11, the same as above described. A rotation with a given speed (let it be N8) in proportion to the fifth gear rotation speed N50 is transmitted to the output side of the synchronizer for the eighth gear via the counter shaft 14 (output shaft), the eighth driven gear 28 and the eighth driving gear G8. Therefore, the difference between the input and output rotation (N11-N8) of the synchronizer for the eighth gear targeted for learning can be kept constant, thereby satisfying the condition of balk position learning.

Furthermore, if a rotation speed on the input side of the synchronizer (S5) for the reverse gear is set to N12, a rotation with a given speed (let it be Nr) in proportion to the fifth gear speed N50 is transmitted to the output side of the synchronizer for the reverse gear via the counter shaft 14 (output shaft), the third driven gear 25 and the reverse driving gear GR. Therefore, a difference between the input and output rotations (N12-Nr) of the reverse gear synchronizer targeted for learning can be kept constant, thereby satisfying the condition of balk position learning.

In the above-described embodiment, the procedure of the synchronizer balk position learning for the even-numbered shift gears is performed in the manner similar to the synchronizer balk position learning for the odd-numbered shift gears, as shown in FIG. 3, but may be performed, as in the conventional manner, with the first clutch C1 in disengagement, the second clutch C2 in engagement and the brake on. This is because the power source entails no likelihood of stalling on account of the first clutch C1 in disengagement even if the main shaft 11 (first input shaft) stops via the one-way clutch 29 by stopping the counter shaft 14 (output shaft) with the brake on.

What is claimed is:

1. A control device for a transmission, the control device comprising a learning control means for learning a balk position of a synchronizer in the transmission, the transmission comprising:
 a first input shaft connected via a first clutch to a power source;
 a second input shaft connected via a second clutch to the power source;
 an output shaft;
 a first shift gear group comprising a plurality of shift gears arranged between the first input shaft and the output shaft, the first shift gear group for transmitting a rotation of the first input shaft via one selected shift gear to the output shaft;
 a first switching mechanism for selecting one shift gear from the first shift gear group, the first switching mechanism including a synchronizer for switching the selected shift gear from a state in which power is transmittable to a state in which power is intransmittable;
 a second shift gear group comprising a plurality of shift gears arranged between the second input shaft and the output shaft, the second shift gear group for transmitting a rotation of the second input shaft via one selected shift gear to the output shaft; and
 a second switching mechanism for selecting one shift gear from the second shift gear group, the second switching mechanism including a synchronizer for switching the selected shift gear from the state in which power is transmittable to the state in which power is intransmittable,
 wherein the learning control means, in order to learn a balk position of one synchronizer, sets either the first or second shift gear group, to which the one synchronizer targeted for learning never belongs, to an arbitrary shift gear, engages both the first and second clutches, detects the balk position of the synchronizer in a process in which the synchronizer targeted for learning is slid, and stores information specifying the detected balk position.

2. The control device for the transmission according to claim 1,
 wherein the first shift gear group includes a lowest shift gear,
 wherein the lowest shift gear is configured to transmit a rotation of the first input shaft via a one-way clutch to the output shaft without being selected by the first switching mechanism, and
 wherein the learning control means learns a balk position of a synchronizer at least belonging to the first shift gear group.

3. A learning method for a synchronizer balk position in a transmission, the transmission comprising:
 a first input shaft connected via a first clutch to a power source;
 a second input shaft connected via a second clutch to the power source;
 an output shaft;
 a first shift gear group comprising a plurality of shift gears arranged between the first input shaft and the output shaft, the first shift gear group for transmitting a rotation of the first input shaft via one selected shift gear to the output shaft;
 a first switching mechanism for selecting one shift gear from the first shift gear group, the first switching mechanism including a synchronizer for switching the selected shift gear from a state in which power is transmittable to a state in which power is intransmittable;
 a second shift gear group comprising a plurality of shift gears arranged between the second input shaft and the output shaft, the second shift gear group for transmitting a rotation of the second input shaft via one selected shift gear to the output shaft; and
 a second switching mechanism for selecting one shift gear from the second shift gear group, the second switching mechanism including a synchronizer for switching the selected shift gear from the state in which power is transmittable to the state in which power is intransmittable, wherein the learning method comprising:

in order to learn a balk position of one synchronizer, setting either the first or second shift gear group, to which the one synchronizer targeted for learning never belongs, to an arbitrary shift gear, engaging both the first and second clutches, detecting a balk position of the synchronizer in a process in which the synchronizer targeted for learning is slid, and storing information specifying the detected balk position.

4. The learning method according to claim 3 wherein the output shaft is configured to idle while both the first and second clutches are in engagement.

* * * * *